United States Patent

[11] 3,625,822

| [72] | Inventor | Paul Langford Mantle |
| | | Gloucester, England |
| [21] | Appl. No. | 729,751 |
| [22] | Filed | May 16, 1968 |
| [45] | Patented | Dec. 7, 1971 |
| [73] | Assignee | Central Electricity Generating Board |
| | | London, England |
| [32] | Priority | May 17, 1967 |
| [33] | | Great Britain |
| [31] | | 22,885/67 |

[54] NUCLEAR REACTORS AND TO FUEL ELEMENT ASSEMBLIES FOR USE THEREIN
13 Claims, 7 Drawing Figs.

[52] U.S. Cl. .................................................... 176/78, 176/81
[51] Int. Cl. ..................................................... G21c 3/32
[50] Field of Search ........................................... 176/78, 81, 76, 73

[56] References Cited

UNITED STATES PATENTS

| 3,096,264 | 7/1963 | Bauer | 176/78 X |
| 3,137,635 | 6/1964 | Moore et al. | 176/78 X |
| 3,212,992 | 10/1965 | Salesse et al. | 176/81 |
| 3,228,853 | 1/1966 | Ritz | 176/78 |
| 3,364,122 | 1/1968 | Mombazet et al. | 176/81 X |
| 3,207,670 | 9/1965 | Fortescue et al. | 176/78 X |

FOREIGN PATENTS

| 859,960 | 1/1961 | Great Britain | 176/81 |
| 863,335 | 3/1961 | Great Britain | 176/81 |
| 1,013,922 | 12/1965 | Great Britain | 176/81 |

Primary Examiner—Carl D. Quarforth
Assistant Examiner—Gary Solyst
Attorney—Mawhinney & Mawhinney ABSTRACT: A fuel element assembly for location in a fuel channel of a nuclear reactor, through which channel coolant is passed longitudinally, comprises a cluster of fuel pins arranged parallel to one another but spaced apart so as to leave a free coolant passage extending completely around each pin for generally longitudinal flow. Some of the pins have multistart helical ribs with a left-handed helix and some have multistart helical ribs with a right-handed helix to impart transverse components to the longitudinal flow in a predetermined pattern to improve the heat transfer from the fuel elements to the coolant.

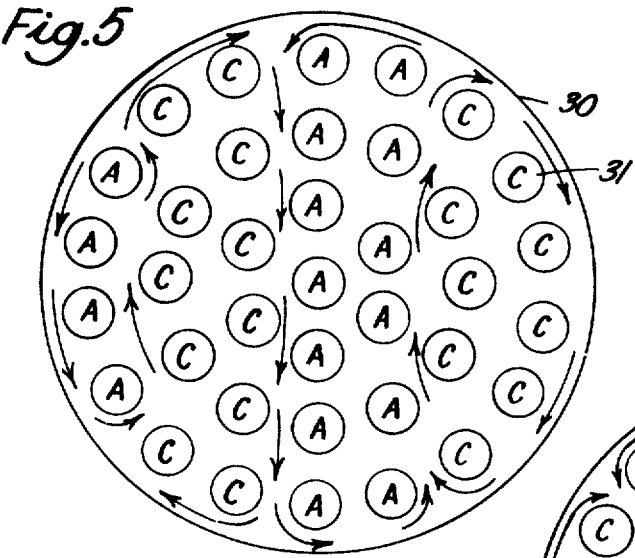
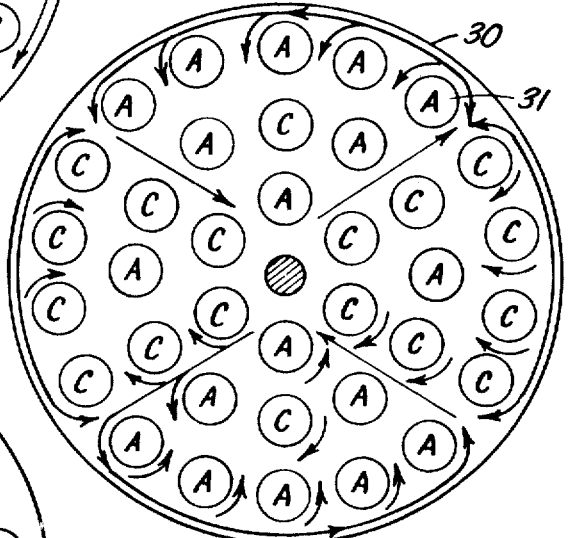
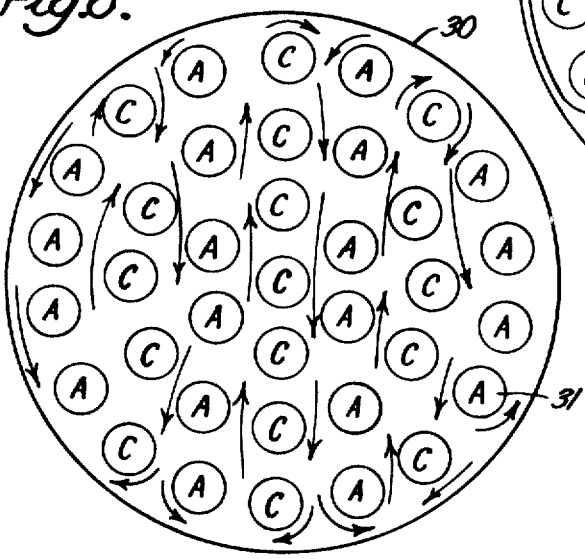

NUCLEAR REACTORS AND TO FUEL ELEMENT ASSEMBLIES FOR USE THEREIN

This invention relates to fuel element assemblies for nuclear reactors of the kind in which a cluster of fuel elements are arranged in each of a number of channels through which flows a fluid, e.g., a gas, constituting a heat transfer medium.

In the type of reactor commonly known as the advanced gas cooled reactor, the fuel elements comprise fuel material in elongated cans; a number of such cans are arranged parallel to one another but spaced apart in each channel through which the gas for cooling the fuel elements flows. In such an arrangement, the individual fuel elements of the cluster are of relatively small diameter compared with earlier types of gas-cooled reactors having a single fuel element in each channel, typically substantially less than 1 inch and, for this reason, are therefore commonly called "pins". These "pins" are typically stainless steel or beryllium cans containing pellets of fuel material. Heretofore it has been the practice for the "pins" to have transverse ribs or a single start helical rib with a very small helix angle, typically about 2°, so as to improve the heat transfer from the fuel element to the coolant gas.

One of the problems with reactors using fuel element clusters of this type is that one side of a fuel element cluster will experience higher flux than another part due to unavoidable discontinuities in the core of the reactor and hence the heat distribution is not uniform. Typically fuel element temperatures might be 40°-60° C. higher on one side of a cluster than on the other. The power output of the reactor is thus restricted compared with what would be possible with a more uniform temperature distribution.

It is an object of the present invention to provide a construction of fuel element assembly giving a more uniform temperature distribution.

According to this invention, a fuel element assembly for a nuclear reactor comprises a cluster of fuel pins arranged parallel to one another but spaced apart in a coolant channel to permit of flow of coolant through the channel in a generally axial direction, at least some of the pins having helical ribs with a left-handed helix and at least some of the pins having helical ribs with a right-handed helix to impart transverse components to the longitudinal flow.

It will be appreciated that when two fuel pins with ribs of opposite sense are adjacent one another, they will both tend to cause the transverse gas flow between them to be in the same direction and it is thus possible, by mixing fuel pins with ribs of the opposite senses in this way, to promote various different patterns of transverse gas flow in the clusters as desired. Fuel pins with left- and right-handed helices may be combined also in the cluster with fuel pins having transverse ribs.

Preferably the ribs are formed as multistart helices. By using multistart helical ribs, the helix angle is substantially greater than that used heretofore for single start helical ribs and this greatly increases secondary flows of the coolant fluid transversely to the axis of the fuel element assembly. Preferably helix angles greater than 10° (for example a helix angle of 35°) are employed and more preferably between 30° and 40°. It is found that such a helix angle will give substantial secondary flow. This causes coolant mixing transversely across the channel and hence gives a more uniform temperature distribution in the fuel element cluster.

The invention furthermore includes within its scope a fuel element assembly for a nuclear reactor comprising a cluster of fuel pins arranged parallel to one another in the coolant channel, at least some of the pins having multistart helical ribs. As described above, preferably some pins have multistart helical ribs with left-handed helices whilst others have ribs with right-handed helices.

The fuel pins may, in the known manner, comprise pellets of fuel material, for example uranium oxide, in stainless steel cans. The ribs may be formed integrally with the can or by wrapping wire around the can. The fuel pins may be supported axially and laterally by support grids at the ends of the assembly and by intermediate braces. Such clusters may be fitted with graphite sleeves to form complete fuel element assemblies which can then be inserted in the reactor.

The following is a description of a number of embodiments of the invention, reference being made to the accompanying drawings in which:

FIG. 1 is a sectional view of part of a fuel element assembly;
FIG. 2 is a side elevation of part of a fuel pin; and
FIGS. 3 to 7 are diagrams illustrating five different arrangements of fuel pins with helical ribs of opposite senses in a fuel element cluster.

Referring to FIG. 1 the fuel element assembly comprises a number, typically 36, fuel pins 10 arranged parallel to one another but spaced apart in a channel formed by concentric graphite sleeves 11, 12. At each end the pins are supported both against lateral and axial movement by a grid 13 which is constructed to give rigid support with however the minimum of resistance to the coolant gas which flows through the channel. At intermediate points along the length of the assembly, braces 14 give support against lateral movement.

A single fuel pin is shown in FIG. 2. This consists of a cylindrical can 20 of a suitable material, typically stainless steel, containing pellets 21 of fuel material, e.g., uranium oxide. The external surface of the can is smooth apart from multistart helical ribs 22 which are of typically square or rectangular section. The ribs are multistart helices and typically might be a 12-start helix with a helix angle of the order of 33°. The coolant flows over this ribbed surface and experiments have shown that coolant which enters the flute region, i.e., the region between the ribs, tends to follow the helical flute for part of the way round the pin and then leaves this flute region, as indicated by the dashed line A in FIG. 2. Near the top of the ribs, the flow is in the direction of the arrow B while more remotely from the ribbed surface, the flow might be in the direction of the arrow C.

Each of FIGS. 3 to 7 shows diagrammatically in cross section a single gas flow channel formed by an outer sleeve 30 containing a cluster of fuel pins 31, the cross section being normal to the axis of the channel. The fuel pins marked C are arranged to give a clockwise twist to the gas flow while those marked A give an anticlockwise twist to the gas flow. In some of the drawings the fuel pins are shown without any letter and these may have transverse ribs. The arrows between fuel pins indicate the direction of the transverse component of the gas flow which occurs between those elements and it will be seen from the various Figures that different arrangements of pins enable many different patterns of gas flow to be set up to give the necessary mixing of the gases transversely and thereby obtain a more uniform temperature distribution in the fuel element cluster.

In FIG. 3, the outermost circle of fuel pins have clockwise ribs, the next inner circle have anticlockwise ribs and the innermost circle have clockwise ribs. At the center of the cluster is a tie rod 32. It will be seen that this arrangement gives coolant mixing by circular components to the flow.

In Fig. 4 the fuel pins are arranged in groups having anticlockwise ribs and groups having clockwise ribs. These provide flow in circular patterns around the groups. The boundaries between the groups are radial so that there are a number (six in this example) of radial paths, the flow being inwardly and outwardly in alternate paths. As in FIG. 3, the central tie rod 32 is smooth. Around the periphery of the cluster, the flow is in opposite directions around successive arcuate portions.

FIG. 5 shows an arrangement in which the transverse components of the coolant flow are in substantially straight parallel paths extending across the assembly. In this particular embodiment all the fuel pins have helical ribs.

FIG. 6 is another arrangement giving transverse flow components along substantially parallel paths across the assembly.

Figure 1:
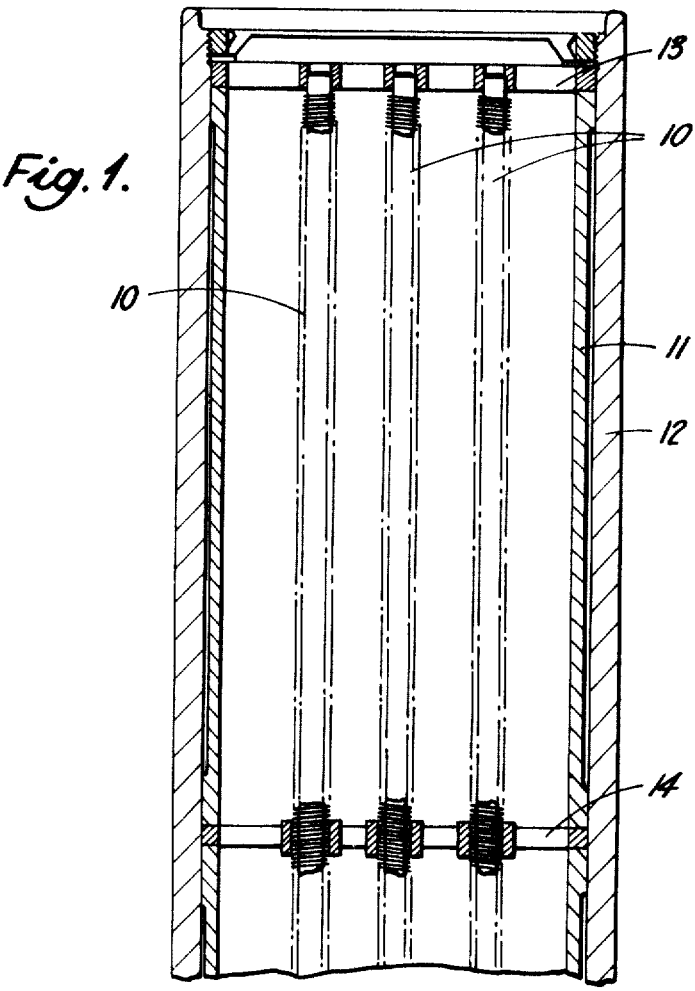
Figure 2:
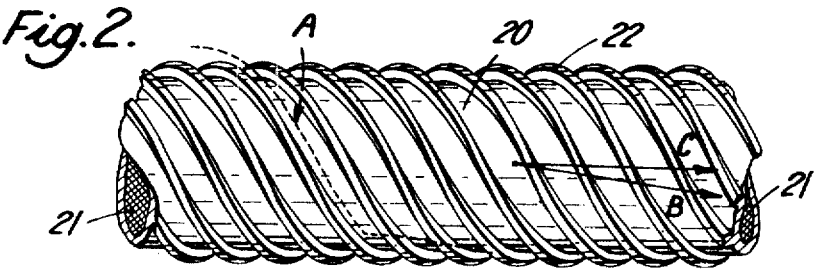
Figure 3:
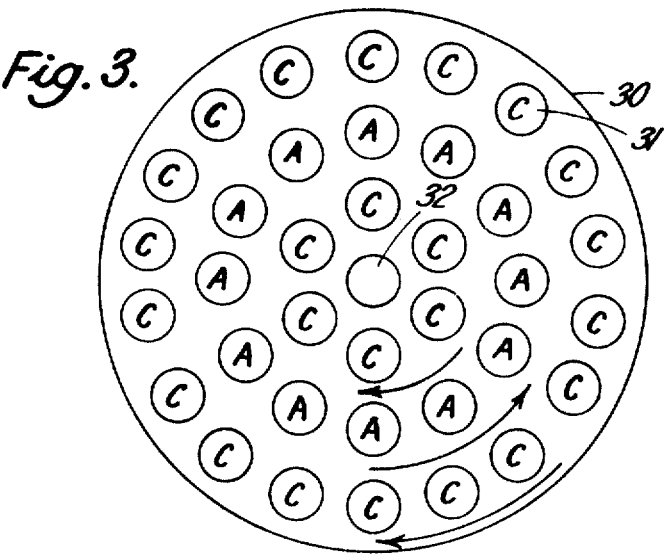
Figure 4:
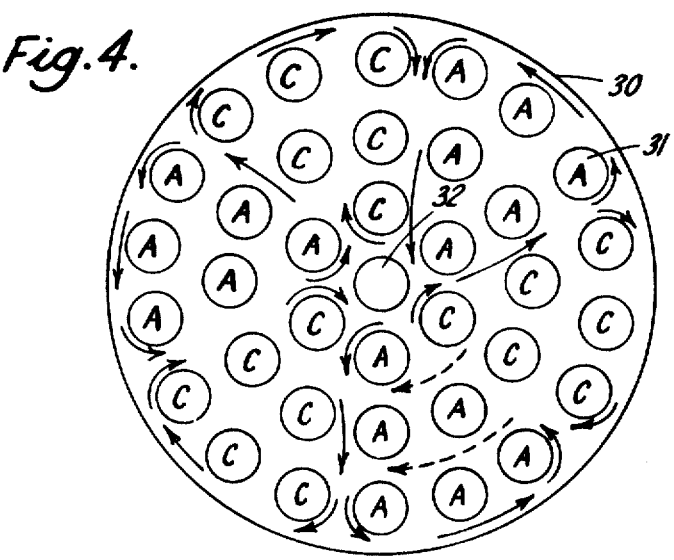

FIG. 7 illustrates an arrangement in which the fuel pins in two opposite sectors have clockwise ribs except for the central pin in each group which has anticlockwise ribs. In the remaining two sectors, the pins have anticlockwise ribs except for the central pin in each of these groups which has clockwise ribs. In this particular embodiment, at the center of the cluster is a tie rod 34 extending between the two support grids.

By mixing of the gas in these ways, a more uniform distribution is obtained than has before been possible and thereby a higher gas outlet temperature becomes possible. Also fuel element bowing will be reduced since this gas mixing will tend to prevent the possibility of one side of the fuel element becoming hotter than the other side.

I claim:

1. A fuel element assembly for use in a nuclear reactor in which the fuel element assembly is located in a channel through which a coolant is passed to extract heat from the fuel, comprising a cluster of fuel pins arranged parallel to one another but spaced apart in the coolant channel to leave a coolant passage extending completely around each pin for flow of coolant through the channel in a generally axial direction, some of the pins having helical ribs with a left-handed helix and some of the pins having helical ribs with a right-handed helix to impart transverse components to the longitudinal flow, the pins with left- and right-hand ribs defining transverse flow paths around groups of pins, each path having on one side of the path a plurality of pins all with left-handed helices and on the other side of the path a plurality of pins all with right-handed helices whereby flow is sustained by ribs of opposite sense along predetermined transverse paths from pin to pin across the coolant channel.

2. A fuel element assembly as claimed in claim 1 wherein the ribs are formed as multistart helices.

3. A fuel element assembly as claimed in claim 1 wherein the ribs are formed integrally with a can containing fuel material.

4. A fuel element assembly as claimed in claim 1 wherein the ribs are formed by wrapping wire around a can containing fuel material.

5. A fuel element as claimed in claim 1 wherein the pins have smooth cylindrical surfaces between the ribs.

6. A fuel element assembly as claimed in claim 1 wherein the helix angle is greater than 10°.

7. A fuel element assembly as claimed in claim 1 wherein the helix angle is between 30° and 40°.

8. A fuel element assembly comprising a plurality of fuel pins arranged parallel to one another but spaced apart leaving a free space around each pin for the axial flow of a coolant, some of the pins having helical ribs with a left-handed helix and others of the pins having helical ribs with a right-handed helix, the spacing apart of the pins being such that there is free space for axial flow outside the ribs all around the pins, the pins with the left- and right-handed ribs defining transverse gas flow paths around groups of pins, each path having on one side of the path a plurality of pins all with left-handed helices and on the other side of the path a plurality of pins all with right-handed helices.

9. A fuel element assembly as claimed in claim 8 wherein the fuel pins are arranged in a circular pattern, all the pins in one circle having helical ribs of one sense, and all the pins in immediately adjacent circles having helical ribs of the opposite sense.

10. A fuel element assembly as claimed in claim 8 wherein the fuel pins are arranged with pins having left-handed ribs on one side and pins having right-handed ribs on the other side of radial paths to impart radial inward motion and radial outward motion of the coolant in separate radial paths.

11. A fuel element assembly as claimed in claim 10 wherein the pins are arranged to provide radially inward and radially outward paths alternately around the cluster.

12. A fuel element assembly as claimed in claim 8 wherein the fuel pins are arranged with pins having left-handed ribs on one side and pins having right-handed ribs on the other side of paths extending around groups of pins to impart circular motion of the coolant around the groups.

13. A fuel element assembly as claimed in claim 8 wherein the fuel pins are arranged with pins having left-handed ribs on one side and pins having right-handed ribs on the other side of paths extending in substantially parallel directions across the coolant channel to impart transverse movement to the coolant along these paths, the arrangement being such that the transverse movement is in opposite directions along alternate paths.

* * * * *